UNITED STATES PATENT OFFICE.

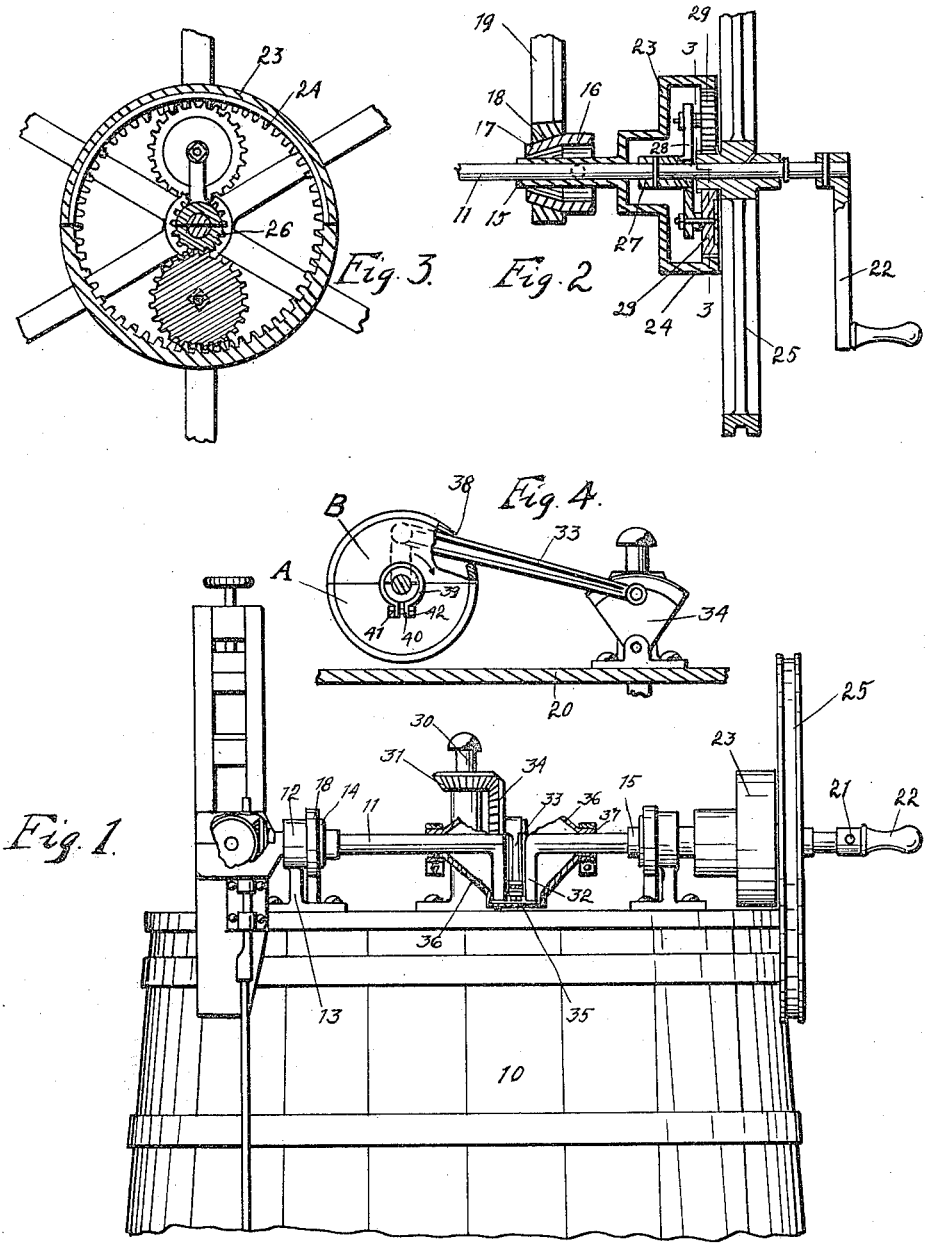

GEORGE W. LEWIS, OF GRINNELL, IOWA.

GEARING DEVICE FOR WASHING-MACHINES.

1,203,883.  Specification of Letters Patent.  Patented Nov. 7, 1916.

Application filed December 8, 1913. Serial No. 805,461.

*To all whom it may concern:*

Be it known that I, GEORGE W. LEWIS, a citizen of the United States, residing at Grinnell, in the county of Poweshiek and State of Iowa, have invented a certain new and useful Gearing Device for Washing-Machines, of which the following is a specification.

The object of my invention is to provide a gearing device of planetary type so constructed and arranged that when a shaft is rotated a fly wheel geared to said shaft by said planetary gearing device will be rotated more rapidly than the shaft.

It will be noted that such an arrangement also serves as a speed reducer where the fly wheel is used as a belt wheel.

Still a further object is to provide bearing devices whereby the shaft may be mounted upon the support and a hinged cover may be pivoted to said shaft to swing on said shaft.

Still a further object is to provide a gear casing designed to inclose a crank shaft for covering and protecting the crank shaft in all positions of its movement.

My invention consists in certain details, in the construction, arrangement and combination of the various parts of the device, whereby the objects contemplated are attained, as hereinafter more fully set forth, pointed out in my claim, and illustrated in the accompanying drawings, in which:

Figure 1 shows a rear elevation of my improved gearing device mounted on a washing machine. The gear casing for the crank shaft is shown in cross section. Fig. 2 shows a vertical, sectional view through my planetary gearing device. Fig. 3 shows a vertical, transverse, sectional view taken on the line 3—3 of Fig. 2, and Fig. 4 shows a sectional, detail view of my improved gear casing and the pitman connected with the crank shaft.

My improved gearing device is especially designed for use with washing machines of the type in which the power shaft may be operated by means of a crank and in which the shaft carries a wheel which may be used either as a balance wheel when the shaft is operated from the crank by hand or may be used as a pulley wheel for driving the shaft from some suitable source of power.

In the accompanying drawings, I have used the reference numeral 10 to indicate the tub of a washing machine. Mounted on the tub 10 is a power shaft 11. The shaft 11 is mounted on one end in a bearing 12 which is secured to the tub 10 by means of a bracket 13. Formed on the bearing 12 is a portion 14 having the shaft of the frustum of a cone.

Mounted on the shaft 11, to permit the rotation thereof near the other end, is a bearing or sleeve 15 on which is mounted a bearing 16 similar in form to the bearing 12 and having formed thereon a cone shaped bearing 17 similar to the bearing 14. A bearing 15 is fixed to the bearing 16. Mounted on the bearings 14 and 17 are cone shaped coacting bearings 18 which are formed on arms 19 and secured to the cover 20 of the washing machine.

By the means just described, the cover 20 is pivoted to swing on the line of the center of the shaft 11. Detachably mounted on the free end of the shaft 11, by means of a pin 21, is a crank or handle 22 for manually turning the shaft 11.

Formed on the bearing 15 is a gear casing 23 having formed on the interior thereof an internal gear 24. Rotatably but non-slidably mounted on the shaft 11 is a wheel 25 which may serve either as a pulley or as a balance wheel. The hub of the wheel 25 extends into the casing 23 and formed on said hub is a small gear 26.

Fixed on the shaft 11 within the gear casing 23 is a sleeve 27 having formed thereon opposite downwardly extending arms 28 carrying shafts on which are mounted gears 29, each of which meshes with the internal gear 24 and with the small gear 26.

It will be seen that when the shaft 11 is operated from the crank handle 22, the sleeve 27 will rotate with the shaft carrying with it the gears 29 which mesh with the gear 26 and cause the wheel 25 to rotate more rapidly than the shaft 11. If desired, the wheel 25 may be geared to an engine or the like and if so the motion of said wheel will be transmitted at a reduced speed to the shaft 11 by means of the gears 26, 29, the arms 28 and the sleeve 27.

Mounted in the cover 20 is a dolly shaft 30 on which is a beveled gear 31.

For transmitting power from the shaft 11 to the shaft 30, I have provided the following means: Formed on the shaft 11, between its ends, a crank gear 34 is pivoted to the cover 20 and meshes with the gear 31, as shown in Figs. 1 and 4. One end of the pitman 33 is pivoted to said segmental gear 34.

For protecting the crank 32 during the operation of the machine, I have provided a new and improved form of gear casing. My gear casing comprises a central, cylindrical portion 35. Connected with or formed on each end of the cylindrical portion 35, is a cone-shaped portion 36. At the smaller end of each cone-shaped portion 36 is a bearing 37 mounted on the shaft 11. The gear casing just described is divided on a longitudinal line into two halves which are indicated generally in Fig. 4 by the reference characters A and B. Formed in the cylindrical portion 35 of the gear casing is an opening 38 through which the pitman 33 is inserted.

For securing the halves A and B together, I have mounted on each of the bearings 37 a band or belt 39 comprising a broken ring having at its ends the outwardly extending flanges or portions 40 which are secured together by means of bolts 41. The band 39 is slightly shorter than the outer circumference of the bearing 37 so that by tightening the nuts 42 on the bolts 41 the bearings 37 may be caused to frictionally engage the shaft 11 so that the gear casing composed of the parts A and B tends to rotate with the shaft 11.

It will be seen that in the practical operation of the shaft 11 and the gear casing hereinbefore described, that the gear casing will swing upwardly and then downwardly with the operation of the pitman 33, and on account of the friction between the gear casing and the shaft 11, the pitman 33 will always engage the edges of the opening 38 and the device will work practically without rattle or noise.

The advantages of my improved planetary gear may be seen from the foregoing description. It is of extremely simple construction and makes it possible to use the wheel 25 as a fly or balance wheel traveling at a more rapid rate of rotation than the shaft 11 when said shaft is operated manually, or to use said wheel as a pulley for operating the shaft 11 from the engine which travels too rapidly for the proper working of the shaft 11 and the dolly of a washing machine.

Another advantage of my invention lies in the manner of mounting the shaft 11 with relation to the tub body 10 and the hinged cover 20 by means of the bearings 12 and 16, 17, 18 and 14.

By the means just described, the hinged cover swings upwardly on the line of the center of the shaft 11 so that the gears 31 and 34 always remain in mesh.

One of the most important advantages of my invention is found in the construction of the gear case, whereby the rotating crank 32 is always protected by the gear casing which moves with the pitman 33.

It is my intention to cover by this application any slight variations in the details of the construction of my device which may come within the scope of the following claim.

I claim as my invention:

A device of the class described, comprising a support, a power shaft, two brackets fixed to the support and each having a hollow body portion near its upper end through which the power shaft is extended, a bearing device at one end of the power shaft pivotally mounted within one of the said brackets, a gear casing carried by said bearing, a second bearing within the other bracket pivotally supported therein, a gear casing carried by said second bearing and having an internal gear, a hub fixed to the power shaft within the latter gear casing, pinions carried by said hub in mesh with the internal gear, and a balance wheel loose on the power shaft and having a pinion in mesh with the pinions on the fixed hub, for the purposes stated.

Des Moines, Iowa, August 22, 1913.

GEORGE W. LEWIS.

Witnesses:
F. P. MARVIN,
J. T. CESSNA,
B. D. PAINE.

Copies of this patent may be obtained for five cents each, by addressing the "Commissioner of Patents, Washington, D. C."